United States Patent [19]

Kitao et al.

[11] Patent Number: 5,089,204

[45] Date of Patent: Feb. 18, 1992

[54] METHOD OF EXTRUDING THERMOPLASTIC RESIN PIPE

[75] Inventors: Koichi Kitao; Nozomu Misaka, both of Kawasaki, Japan

[73] Assignee: NKK Corporation, Tokyo, Japan

[21] Appl. No.: 591,731

[22] Filed: Oct. 2, 1990

[30] Foreign Application Priority Data

Mar. 16, 1990 [JP] Japan .................. 2-067438

[51] Int. Cl.$^5$ .............................. B29C 47/90
[52] U.S. Cl. .............. 264/209.4; 264/209.8; 425/325; 425/380
[58] Field of Search .............. 264/209.3, 209.4, 209.5, 264/209.1, 209.8, 560, 562, 566, 567, 568, 209.7; 425/326.1, 467, 379.1, 378.1, 380, 325, 72.1

[56] References Cited

U.S. PATENT DOCUMENTS

| | | | |
|---|---|---|---|
| 3,103,409 | 9/1963 | Bohres et al. | 264/209.7 |
| 3,129,461 | 4/1964 | Zavasnik et al. | 264/209.1 |
| 3,187,383 | 6/1965 | Bacchus et al. | 264/209.4 |
| 3,212,135 | 10/1965 | Branscum | 425/326.1 |
| 3,871,807 | 3/1975 | Meyniel | 425/326.1 |
| 3,907,961 | 9/1975 | Carrow | 264/209.7 |
| 4,663,107 | 5/1987 | Takada et al. | 264/209.4 |
| 4,888,148 | 12/1989 | Hartitz | 264/209.4 |

FOREIGN PATENT DOCUMENTS

| | | | |
|---|---|---|---|
| 57-210831 | 12/1982 | Japan | 264/209.4 |
| 2-59330 | 2/1990 | Japan | 264/209.4 |

*Primary Examiner*—Jeffery Thurlow
*Attorney, Agent, or Firm*—Frishauf, Holtz, Goodman & Woodward

[57] ABSTRACT

The invention provides a method of extruding a thermoplastic resin pipe wherein the steps of the method are extruding a melt of the thermoplastic resin by a die, and sizing the melt by a cylindrical sizer, in which the outer diameter of a die lip is smaller than the outer diameter of the sized pipe, and the thickness of the die lip is smaller than the thickness of the sized pipe. Take up rate is 50 to 20 m/min. The temperature of the melt in the extruding process is 30° C. to 90° C. above the melting temperature of the melt at an outer pipe diameter from 11 to 114 mm.

12 Claims, 2 Drawing Sheets

METHOD OF EXTRUDING THERMOPLASTIC RESIN PIPE

BACKGROUND OF THE INVENTION

1. Field of the Invention

The invention relates to the field of the method of extruding thermoplastic resin pipes which are utilized in gas supply or other general purpose areas.

2. Description of the Related Art

In the conventional method wherein thermoplastic pipes are extruded, the deformation is carried out mainly in the axial direction. The material is elongated to the axial direction, which causes the molecular chain of the resin to be oriented in that direction. As the result of the extrusion, the property of the pipe is not uniform wherein the strength of the pipe in the direction of the axis is high and the strength thereof in the direction of circumference is low.

Japanese Patent laid open 36628/1982 discloses a method of preventing the deterioration of the property of the resin pipes. FIG. 4 is an exemplary view of the apparatus in a conventional method. As shown in FIG. 4, the tubular body, extruded by the die 42 installed at the outlet of the extruder 41, is transferred to the blow drawing device 45, which continuously draws the tubular body, and which applies the force of expansion on the tubular body by sucking the air surrounding the outer surface of the body. The step is called "blow drawing". The drawn body is transferred by the taking up machine 46.

FIG. 2 is a sectional side view of the material flow of the resin in the conventional method. In FIG. 2, 1 denotes the die; 2, the outer diameter of the die lip; 3, the thickness of the die lp; 4, the sizing device; 5, the inner diameter of the sizing device; 6, the outer portion of the die; 7, the inner portion of the die. The die lip encompasses the body being extruded with the die at the outlet of the die. In the conventional method the outer diameter of the die lip 2 is the same as or larger than the inner diameter 5 of the sizing device 4. The shape of the die lip is determined by a clearance formed between the outer portion of die 6 and the inner portion of die 7.

The percentage of the difference between the outer diameter of the die lip and the inner diameter of the sizing device, divided by the outer diameter of the die lip is called the reduction ratio.

In the conventional method, the higher the speed of the extrusion the worse the property of the resin pipe. Moreover the greater the reduction ratio the worse the property of the resin pipe. FIG. 3 graphically shows the relationship between the take up rate and fracture elongation for pipes extruded at varying reduction ratios. The abscissa denotes the take up rate or the drawing speed, and the ordinate denotes fracture elongation. The percentage referring to each curve denote the reduction ratio. Generally speaking a value of fracture elongation of 125% is the lowest limit of the guaranteed quality. As shown in FIG. 3, the higher the drawing speed and the higher the reduction ratio, the worse the rupture elongation.

Japanese Patent laid open 36628/1982 reports that the inherent elongation property of the resin pipe is lowered since the pipe possesses a residual stress due to the deformation in the axial and circumferential directions in the production process. When the pipe is under internal pressure, a slitting rupture or tearing off may occur. When the pipe is utilized for a long duration of time, or warm water flows in the pipe, the dimensional change due to the shrinkage of the pipe or a crack rupture due to the stress concentration at the fixed part may occur. When the pipe is bent with a small curvature, a bending stress is generated which leads to a crack rupture or a buckling.

SUMMARY OF THE INVENTION

It is an object of the invention to provide a method of extruding thermoplastic pipes wherein the inherent properties of the pipe are retained, the residual stress is minimized, and the pipe is produced at high speed.

The present invention provides a method of extruding a thermoplastic resin pipe comprising the steps of:

extruding a melt of said thermoplastic resin through a die, and sizing the extruded melt by a cylindrical sizer, wherein the outer diameter of a die lip is smaller than the outer diameter of the sized pipe, and the thickness of said die lip is smaller than the thickness of the sized pipe.

In this process the temperature in the steps of extruding varies from the melting temperature of the resin by plus 30° C. to plus 90° C.

The outer diameter of the product varies from 8 A to 100 A of the Japan Industrial standard or from 11 mm to 114 mm, but principally there is no restriction of the dimension.

As for the material of the pipe, there is no limitation so far as the material is a thermoplastic resin. The following are examples to be used in the invented process; polyethylene, polybutene, polyamide, polycarbonate, polyacetal, ABS, polyphenylene oxide, polyphenylene sulphide, polyethylene terephthalate, polysulfone, polyether ether ketone, etc.

As for the take up rate, it preferably varies from 5 to 20 m/min.

DESCRIPTION OF THE PREFERRED EMBODIMENT

Figure 1:
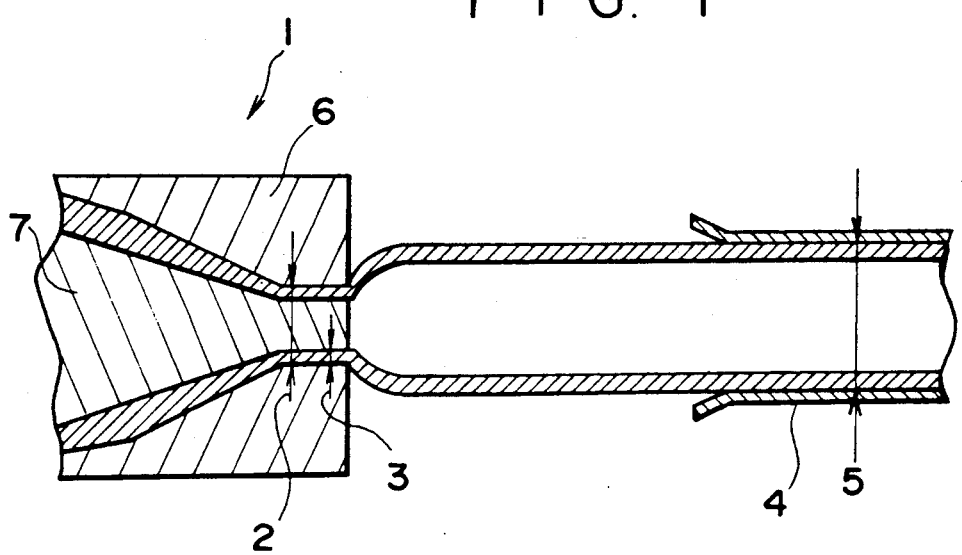
FIG. 1 is a sectional side view of the material flow of the synthetic resin in the invented method.
Figure 2:
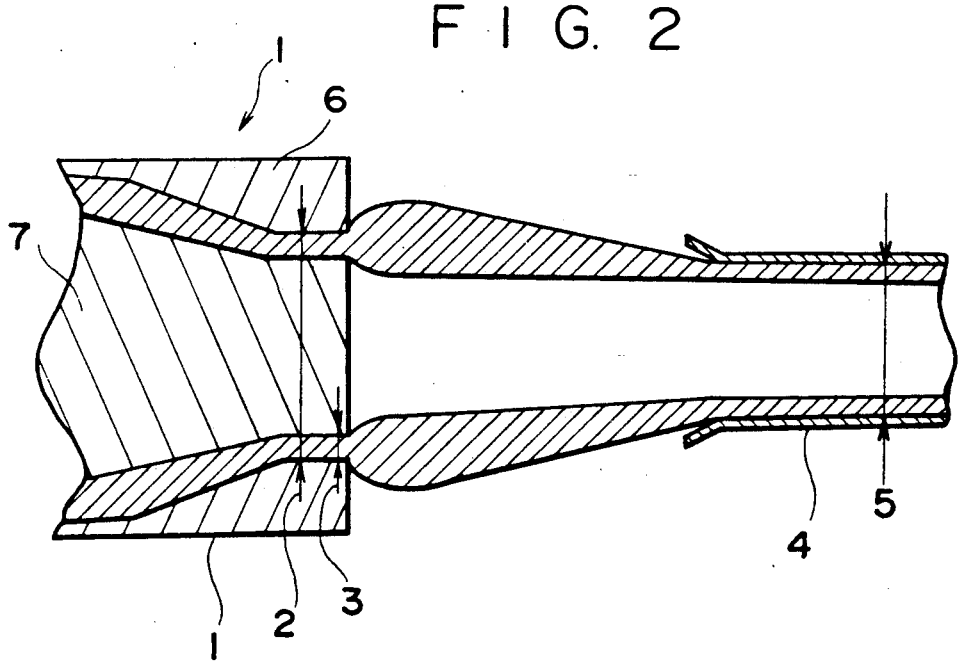
FIG. 2 is a sectional side view of the material flow of the synthetic resin in the conventional method.
Figure 3:
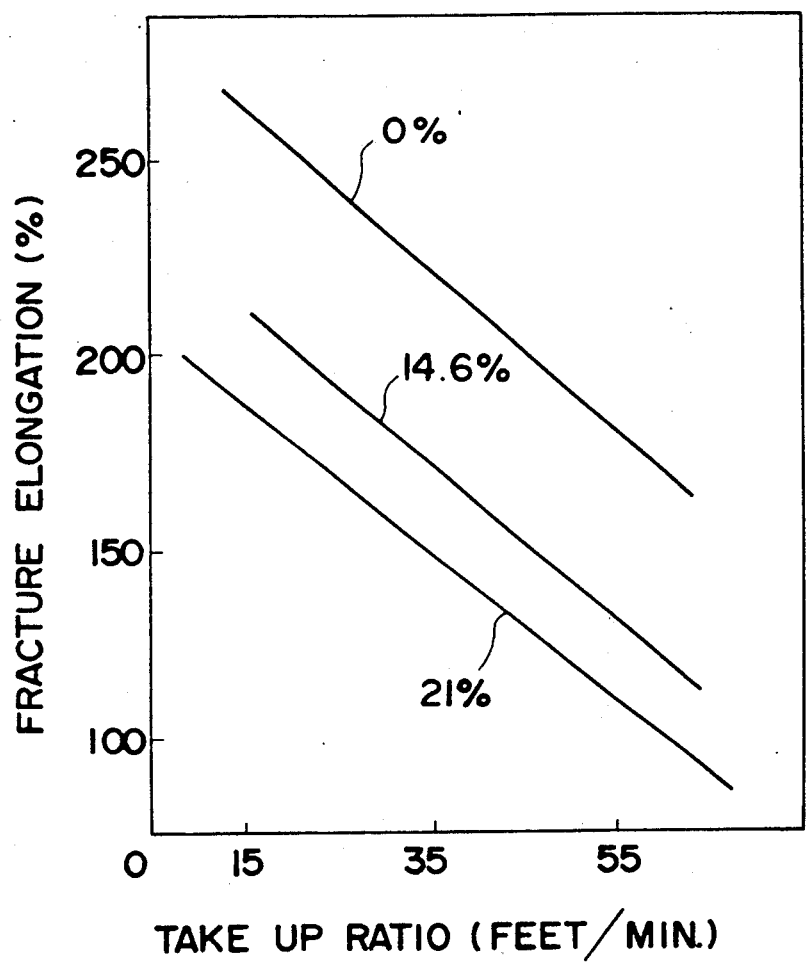
FIG. 3 graphically shows the relationship between take up rate and fracture elongation for pipes extruded at varying reduction ratios.
Figure 4:
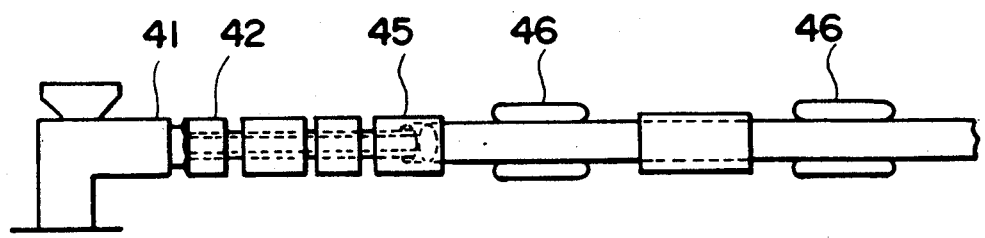
FIG. 4 is an explanatory view of the conventional apparatus.

FIG. 1 is a sectional side view of the material flow of the synthetic resin in the invented method. As shown in FIG. 1, the outer diameter of the die lip 2 is smaller than the inner diameter of the sizing device, or the sizing sleeve 5, which is the outer diameter of the product. Furthermore, the thickness of the die lip is smaller than the thickness of the product.

The mechanical properties of the pipe have a close relationship with the flow behavior of the metal in the extrusion and the drawing process. The molecular orientation should be minimized to maintain the properties, such as fracture elongation, of the pipe, since the orientation lowers the mechanical properties. The flow stress of the melt should be minimized in the flow behavior. Especially the stress at the inlet of the sizing sleeve should be lowered which is related to the ratio of the deformation or the reduction ratio mentioned before.

The relationship between the molecular orientation and the mechanical properties are verified wherein the orientation is measured by laser Raman spectroscopy.

In the case of FIG. 1, the flow stress is considerably lowered since the flow behavior as a whole is expanding and not reducing wherein the reduction ratio is minus and the thickness is increased.

In this process the temperature in the steps of forming varies from the melting temperature of the resin by plus 30° C. to plus 90° C.

The outer diameter of the product varies from 8 A to 100 A of the Japan Industrial standard or from 11 mm to 114 mm, but principally there is no restriction of the dimension.

As for the material of the pipe, there is no limitation so far as the material is a thermoplastic resin. The follow are examples to be used in the invented process; polyethylene, polybutene, polyamide, polycarbonate, polyacetal, ABS, polyphenylene oxide, polyphenylene sulphide, polyethylene terephthalate, polysulfone, polyether ether ketone, etc.

As for the take up rate it preferably varies from 5 to 20 m/min.

EXAMPLES

Example of Invented Method 1

A test is conducted using polybutene as the material of the pipe having an outer diameter of 17.0 mm and a thickness of 2.2 mm, according to the following conditions of forming:
  outer diameter of die lip: 11.21 mm;
  thickness of die lip: 2.18 mm;
  inner diameter of sizing sleeve: 17.0 mm; and
  take up rate: 5.0 m/min.

Example of Invented Method 2

A test is conducted using polybutene as the material of the pipe having the an outer diameter of 17.0 mm and a thickness of 2.2 mm, according to by the following conditions of forming:
  outer diameter of die lip: 11.21 mm;
  thickness of die lip: 2.18 mm;
  inner diameter of sizing sleeve: 17.0 mm; and
  take up rate: 20.0 m/min.

Example of Comparison 1

A test is conducted using polybutene as the material of the pipe having the an outer diameter of 17.0 mm and a thickness of 2.2 mm, according to the following conditions of forming:
  outer diameter of die lip: 16.93 mm;
  thickness of die lip: 2.18 mm;
  inner diameter of sizing sleeve: 17.0 mm; and
  take up rate: 5.0 m/min.

Example of Comparison 2

A test is conducted using polybutene as the material of the pipe having the an outer diameter of 17.0 mm and a thickness of 2.2 mm, according to the following conditions of forming:
  outer diameter of die lip: 16.93 mm;
  thickness of die lip: 2.18 mm;
  inner diameter of sizing sleeve: 17.0 mm; and
  take up rate: 20.0 m/min.

Example of Comparison 3

A test is conducted using polybutene as the material of the pipe having the an outer diameter of 17.0 mm and a thickness of 2.2 mm, according to the following conditions of forming:
  outer diameter of die lip: 29.60 mm;
  thickness of die lip: 2.18 mm;
  inner diameter of sizing sleeve: 17.0 mm; and
  take up rate: 5.0 m/min.

The finished pipes of these examples have been tested for the fracture elongation and the results are summarized in Table 1.

TABLE 1

| Case of Example | Die Lip OD (mm) | Die Lip Thickness (mm) | Product OD (mm) | Product Thickness (mm) | Take Up Rate (m/min) | Fracture Elongation (%) |
| --- | --- | --- | --- | --- | --- | --- |
| Invented 1 | 11.21 | 2.18 | 17.0 | 2.2 | 5.0 | 306 |
| Invented 2 | 11.21 | 2.18 | | | 20.0 | 279 |
| Conventional 1 | 16.93 | 2.18 | | | 5.0 | 281 |
| Conventional 2 | 16.93 | 2.18 | | | 20.0 | 185 |
| Conventional 3 | 29.60 | 2.85 | | | 5.0 | 120 |

Table 1 reports the effect of the dimensions of the die lip and the take up rate on the fracture elongation. As for the effect of outer diameter of the die lip in comparison with the inner diameter of the sizing sleeve, fracture elongation is lower when the outer diameter is larger than the inner diameter of the sizing sleeve, which is shown in the invented example 1 and the comparison example 3, wherein the value of fracture elongation of the latter is smaller than that of the former by 60% even if the take up rate is 5.0 m/min. for both cases. As for the effect of the take up rate, the lowering of fracture elongation is minor when the take up rate is increased from 5.0 m/min. to 20.0 m/min., in the invented method compared with the conventional method, which is shown in invented examples 1, and 2 and comparison examples 1, and 2. The value of fracture elongation in comparison example 2 is lower than that of comparison example 1 by 35%.

Table 2 reports the effect of the dimension of the finished product.

As the outer diameter of the finished product increases, the lowering of the fracture elongation lessens in spite of the adoption of the invented method.

Therefore this invention is most applicable when the product size is comparatively small.

TABLE 2

| Case of Example | Die Lip OD (mm) | Die Lip Thickness (mm) | Product OD (mm) | Product Thickness (mm) | Take Up Rate (m/min) | Fracture Elongation (%) |
| --- | --- | --- | --- | --- | --- | --- |
| Invented | 29.60 | 2.85 | 34.0 | 2.70 | 4.0 | 290 |
| Conventional | 42.86 | 4.57 | | | 4.0 | 242 |
| Invented | 29.60 | 2.85 | | | 10.0 | 252 |

TABLE 2-continued

| Case of Example | Die Lip OD (mm) | Die Lip Thickness (mm) | Product OD (mm) | Product Thickness (mm) | Take Up Rate (m/min) | Fracture Elongation (%) |
|---|---|---|---|---|---|---|
| Conventional | 42.86 | 4.57 | | | 10.0 | 192 |
| Invented | 66.13 | 5.78 | 76.0 | 6.00 | 0.95 | 218 |
| Conventional | 87.38 | 7.34 | | | 0.95 | 207 |
| Invented | 66.13 | 5.78 | | | 3.0 | 197 |
| Conventional | 87.38 | 7.34 | | | 3.0 | 182 |
| Invented | 102.20 | 8.50 | 114.0 | 9.00 | 0.62 | 139 |
| Conventional | 131.03 | 10.93 | | | 0.62 | 134 |
| Invented | 102.20 | 8.50 | | | 1.3 | 129 |
| Conventional | 131.20 | 10.93 | | | 1.3 | 124 |

What is claimed is:

1. A method of extruding a thermoplastic resin pipe comprising the steps of:
   extruding a melt of a thermoplastic resin through a die at an extruded product take up rate of 5 to 20 m/min and at a temperature that is higher than the melting temperature of the thermoplastic resin by 30° to 90° C.; and
   sizing the extruded product output from the die by passing the extruded product through a cylindrical sizer to produce a sized extruded product, the outer diameter of a lip of the die being smaller than the outer diameter of the sized extruded product and the thickness of the lip of the die being smaller than the thickness of the sized extruded product;
   wherein the outer diameter of the sized extruded thermoplastic resin pipe product is from 11 to 114 mm.

2. The method of extruding a thermoplastic resin pipe of claim wherein the material of the product is polybutene.

3. The method of extruding a thermoplastic resin pipe of claim 1, wherein the material of the product is polyethylene.

4. The method of extruding a thermoplastic resin pipe of claim 1, wherein the material of the product is polyamide.

5. The method of extruding a thermoplastic resin pipe of claim 1, wherein the material of the product is polycarbonate.

6. The method of extruding a thermoplastic resin pipe of claim 1, wherein the material of the product is polyacetal.

7. The method of extruding a thermoplastic resin pipe of claim 1, wherein the material of the product is ABS.

8. The method of extruding a thermoplastic resin pipe of claim 1, wherein the material of the product is polyphenylene oxide.

9. The method of extruding a thermoplastic resin pipe of claim 1, wherein the material of the product is polyphenylene sulphide.

10. The method of extruding a thermoplastic resin pipe of claim 1, wherein the material of the product is polyethylene terephthalate.

11. The method of extruding a thermoplastic resin pipe of claim 1, wherein the material of the product is polysulfone.

12. The method of extruding a thermoplastic resin pipe of claim 1, wherein the material of the product is polyether ether ketone.

* * * * *

UNITED STATES PATENT AND TRADEMARK OFFICE
CERTIFICATE OF CORRECTION

PATENT NO. : 5,089,204
DATED : February 18, 1992
INVENTOR(S) : KITAO et al It is certified that error appears in the above-identified patent and that said Letters Patent is hereby corrected as shown below:

Column 1, line 38, replace "with the die" with
--within the die--

Column 1, line 56, after "The percentage", insert
--numbers--.

Column 3, line 16, replace "The follow" with
--The following--.

Column 3, line 49, delete "by".

Column 4, line 7, after "having", delete "the".

Column 4, line 25, delete "the" before "fracture".

Abstract, line 7-8, replace "50 to 20 m/min."
with --5 to 20 m/min.--.

Signed and Sealed this

Fifth Day of October, 1993

*Attest:*

BRUCE LEHMAN

*Attesting Officer*     Commissioner of Patents and Trademarks